(12) United States Patent
Jones et al.

(10) Patent No.: US 6,343,506 B1
(45) Date of Patent: Feb. 5, 2002

(54) TYRE PRESSURE DETERMINATION

(75) Inventors: Barbara L. Jones; Paul Smith; David Stollery, all of Norfolk (GB)

(73) Assignee: Snap-on Equipment Limited, King's Lynn (GB)

( * ) Notice: Subject to any disclaimer, the term of this patent is extended or adjusted under 35 U.S.C. 154(b) by 0 days.

(21) Appl. No.: 09/423,400

(22) PCT Filed: May 14, 1998

(86) PCT No.: PCT/GB98/01373

§ 371 Date: Jan. 13, 2000

§ 102(e) Date: Jan. 13, 2000

(87) PCT Pub. No.: WO98/52008

PCT Pub. Date: Nov. 19, 1998

(51) Int. Cl.[7] ................................................. G01G 3/14
(52) U.S. Cl. ........................................................ 73/146.2
(58) Field of Search ................................. 73/146, 146.2, 73/753

(56) References Cited

U.S. PATENT DOCUMENTS

| | | | | |
|---|---|---|---|---|
| 4,630,470 A | * | 12/1986 | Brook et al. | 73/146.2 |
| 5,445,020 A | * | 8/1995 | Rosensweig | 73/146.2 |
| 5,749,984 A | * | 5/1998 | Frey et al. | 73/146.2 |
| 5,753,810 A | * | 5/1998 | Bass | 73/146.2 |
| 5,942,681 A | * | 8/1999 | Vollenweider et al. | 73/146.2 |

* cited by examiner

*Primary Examiner*—Robert Raevis
(74) *Attorney, Agent, or Firm*—Seyfarth Shaw (57) ABSTRACT

A method and apparatus for determining tire pressure in automotive vehicles utilices twin spaced parallel and non-transverse piezoelectric cables which are traversed by a vehicle to produce a voltage pulse having a shapes or profiles characteristic of the tire pressure. Waveform analysis on the basis of a software algorithm and/or look-up calibration data enables numerical pressure determination. The system is well adapted for remote automotive vehicle tire pressure sensing under normal conditions of vehicle use.

17 Claims, 5 Drawing Sheets

TYRE PRESSURE DETERMINATION

This invention relates to a method and apparatus for tire pressure determination particularly, but not exclusively, applicable to automotive vehicle tire pressure determination, notably as applied to automobile and truck tire pressure determination, but applicable to vehicle tire pressures generally.

Tire pressure surveys and other available data indicate a considerable need for some more convenient and readily used method for tire pressure determination than the conventional method of directly measuring the pneumatic pressure in the tire at the time of inflation and subsequently.

If some external sensor system could be provided which did not require any active intervention on the part of the vehicle driver, this would obviously be extremely beneficial and useful. However, although systems for remote sensing of vehicle operating parameters have been proposed including the use of ultrasonic sensors, no system of that kind appears to be readily applicable to tire pressure determination on a remote basis.

Nethertheless, we are aware from our co-pending European patent application EP 96307897.7 (our reference P52835EP), due to be published May 28, 1997, that sensory determinations through the tires of a vehicle can be effectively made using piezo electric sensors, notably such in cable and similar format whereby the loading of the cable is effected in such a manner that the load is applied at spaced apart positions on the piezo electric material.

We are aware of course that piezo electric cable type materials have been used widely for sensing traffic movements, with the piezo electric material in the format of a road-surface-mounted device which produces an electrical impulse on the passage of a vehicle. Such impulses may have been analysed in various ways in the past, mainly simply on the basis of mere counting of pulses. Possibly proposals may have been made for more sophisticated analysis of such data.

The present invention is based upon our discovery that the passage of a vehicle tire over a piezo electric cable produces a waveform which has characteristics of shape and form which enable the pressure of the tire to be determined by appropriate analysis of such form and/or shape. It is believed that it has not previously been proposed to analyse the waveform and/or shape of such piezo-electric-cable-produced electronic pulses for this purpose.

Moreover, we have discovered that the pulses thus produced are affected in terms of their pulse width and height by the speed of the vehicle and its weight. An important aspect of the present invention relates to the interpretation of the data obtainable from the piezo electric device to take account of these factors, including a method for actually eliminating or offsetting their effects.

The present invention takes as the state of the art from which claim 1 commences as the use of signals from piezo electric cable devices mounted on roadway surfaces for numerical traffic monitoring purposes.

DISCLOSURE OF PRIOR ART

There is disclosure in:
  EP-A-0 545 641 (Exxon)
  EP-A-0 656 269 (Exxon)
of a system for determining pneumatic tire pressure and/or velocity in which an two-dimensional array of force sensors in a driveway or the like determine the pattern of force distribution exerted by a tire in its contact footprint across the width of the tire and a computer determines tire pressure and/or velocity from the sensed contact forces.

There is disclosed in U.S. Pat. No. 4,630,470 (Brooke) a system for determining tire pressure of vehicles as they pass an instrumented check point on a roadway. Rigid corrugations on the roadway set the tires into vibration with a waveform which is a function of tire pressure. Below the roadway surface directly beneath a metal plate on which the corrugations are formed to provide the road surface there are provided multiple costly transducers which convert the mechanical vibrations caused by the tires to identical electrical waveforms. The spacing 26 between adjacent ridges of the corrugations or ribs varies with the type of vehicle being checked. It has been found that the ideal spacing for a jeep is 2.0 inches and 3.1 inches for a 5 tonne military truck. In accordance with the invention, the spacing between the ridges is variable within this range. The waveforms produced by the tires passing over these ribs are subjected to spectral analysis based on the concept of detecting one or more tires which has a differing spectrum from the others and therefore is at a different pressure. No means is disclosed for actual quantitative numerical determination of the tire pressure, but only for detecting differences in pressure.

To the best of the Applicants' knowledge there has been no prior proposal for the use of a piezoelectric cable sensor/detector device located on a roadway traversed by automotive vehicles to provide a signal which is generated by direct loading of the device by the compressive engagement by the vehicle tires across the lateral widths of the tires without any mechanical intervention or intermediary device (such as the ribs of the Brook patent), and from which signal the tire pressure is determined quantitatively directly by non-spectral analysis and without the need for comparison with detectors responding to other tires of the same vehicle.

There is disclosed in EP-A-0 387 092 (Gebert) traffic monitoring equipment such as traffic speed detection equipment. The invention is concerned with the provision of validation checks for such equipment to enhance the reliability and accuracy and convenience of operating such equipment. Such validation is needed, for example, in order to check the level of insulation resistance between conductors in a particular cable. The invention is applicable to any traffic data collection equipment. The idea is to monitor the gradual or abrupt deterioration of a cable in service conditions leading to degrading of the insulation resistance which can lead to erroneous measurements and degraded accuracy or reliability. The invention provides apparatus for validation checks applied to traffic monitoring equipment. For example, the invention checks the level of insulation resistance of the equipment (page 2, line 43). It also validates operation by means of a facility for signal strength monitoring (page 3, line 5). For this purpose, a minimal signal level is required as a valid trigger for time pulses and (line 12) "in reference to a curve of the signal drawn on a time base the first pulse (be it positive or negative), must have a minimum steepness ie a minimum value of the first differential of magnitude of the pulse with respect to time". Claim 2 refers to the curve of the signal needing to have a minimum steepness for use for traffic speed detection purposes. Accordingly, the voltage profile has relevance only in relation to achieving a "minimal signal level before being detected as a valid trigger for time pulses" (see page 3 at line 7). The shape of the waveform is only used to determine whether the waveform is or is not acceptable in terms of meeting the prescribed requirement for a minimal signal. Having achieved that minimal signal level, the waveform is used merely as a pulse and speed is determined as stated on page 4 at line 32:—"in normal speed timing equipment using such cables two parallel spaced cables are set on the road in an array and the time is measured between a pulse being generated in a first cable and a pulse generated in the second cable by the same wheel set of a vehicle. On this basis speed is calculated by the formula distance divided by time". This disclosure provides no suggestion that the skilled person could expect to determine numerically speed or any other vehicle parameter by means of waveform analysis.

There is disclosed in EP-A-0 502 803 (ECM) equipment for establishing efficient measurement of the dynamic loads applied to a roadway by traffic. It is stated that currently known signal processing methods do not take into account various factors including the effect of under-inflated tires and the object of the invention is to eliminate all of the adjustments necessary with previous proposals.

FIG. 3 of the EP 803 specification shows the form of signal "according to the tire inflation". In the description it is stated that FIGS. 3a and b demonstrate the form of the signals received for two identical axles with respectively inflated and uninflated tires 3a and b. The measurement show that at constant speed and loads when the tire is uninflated the duration of the signal is greater and the peak value is weaker. The description goes on to say that these two diagrams show that measurement (of vehicle dynamic loads applied to the roadway) by amplitude is not correctly founded and that it is not sufficient to take into consideration the duration of the pulse in order to perform a speed correction, since the duration of this pulse is dependent on the inflation of the tire.

By inspection of FIGS. 3a and 3b of the EP 803 specification it is plain that the disclosure amounts to this. With a properly inflated tire you obtain a fairly sharp and upright voltage pulse 23 as shown in FIG. 3a and with an uninflated tire you get a voltage pulse having a slightly lower amplitude and a significantly greater pulse width or wavelength. Technically, the foot print of the tire on the road is larger when the inflation pressure is lower and the vehicle load is applied over this larger area to the roadway surface as shown at 25 in FIG. 3b. The result is a reduced voltage pulse height or amplitude and an increased voltage pulse duration while the larger foot print passes over the sensor. No disclosure relating to analysis of the shape or profile of the waveform is provided.

According to the invention there is provided a method and apparatus for automotive vehicle information determination including tire pressure and related determinations, as defined in the accompanying claims.

In an embodiment described below, there is provided a method and apparatus whereby tire pressure determination is effected by the simple expedient of causing a vehicle wheel/tire assembly to pass over an elongated piezo electric cable sensor element for compressive engagement with it across the lateral width of the tire, the sensor being located on or at the roadway surface or the like. This can be done at relatively low speed, for example during manoeuvres within an automotive servicing facility, or in a garage or petrol station forecourt.

Figure 4:
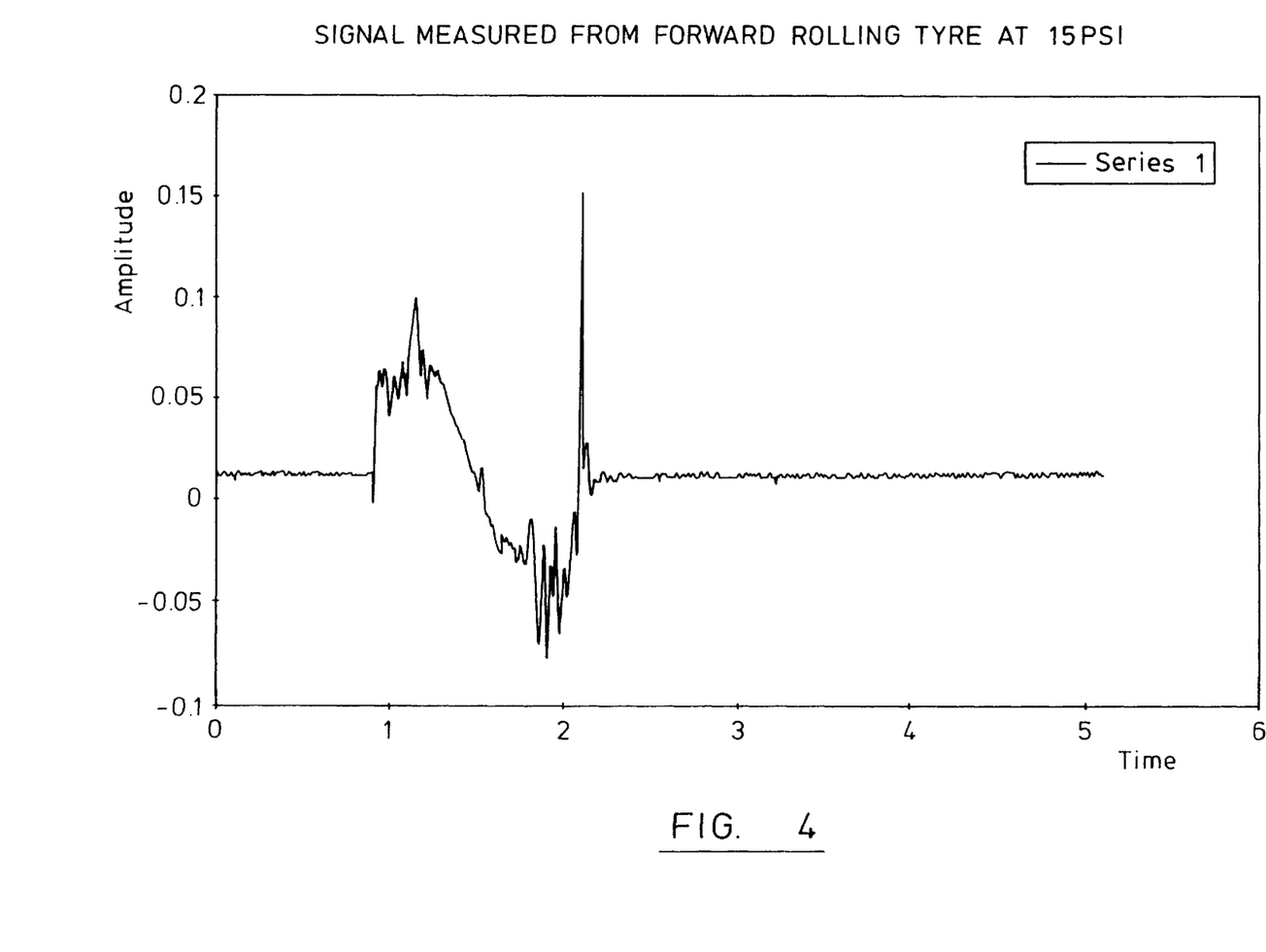
FIG. 4 shows the pulse profile for a forward rolling tire at 15 psi corresponding to under-inflation of the tire.
Figure 5:
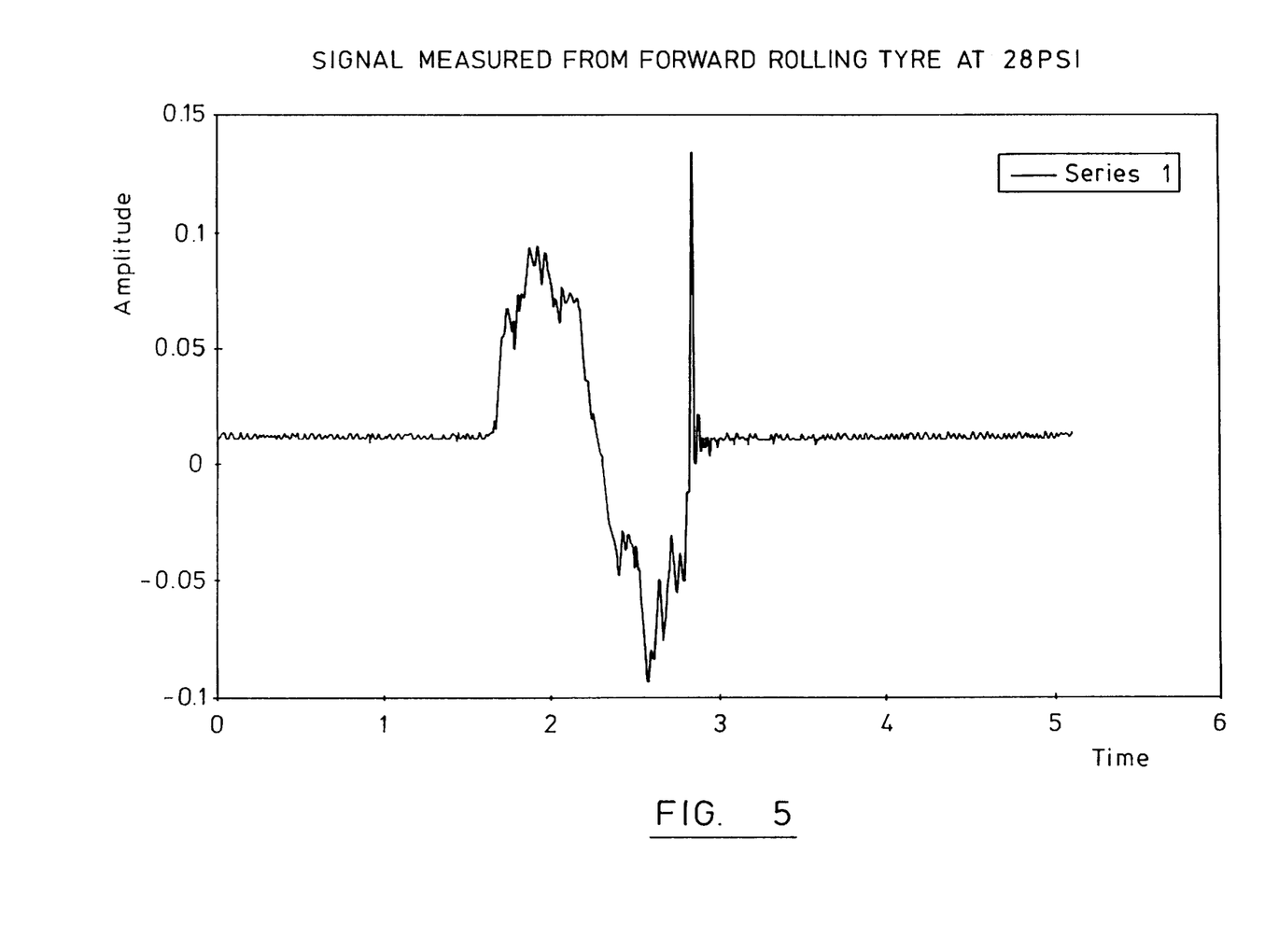
FIG. 5 shows a corresponding pulse profile for a forward rolling tire at 28 psi, corresponding to correct inflation of the tire.
Figure 6:
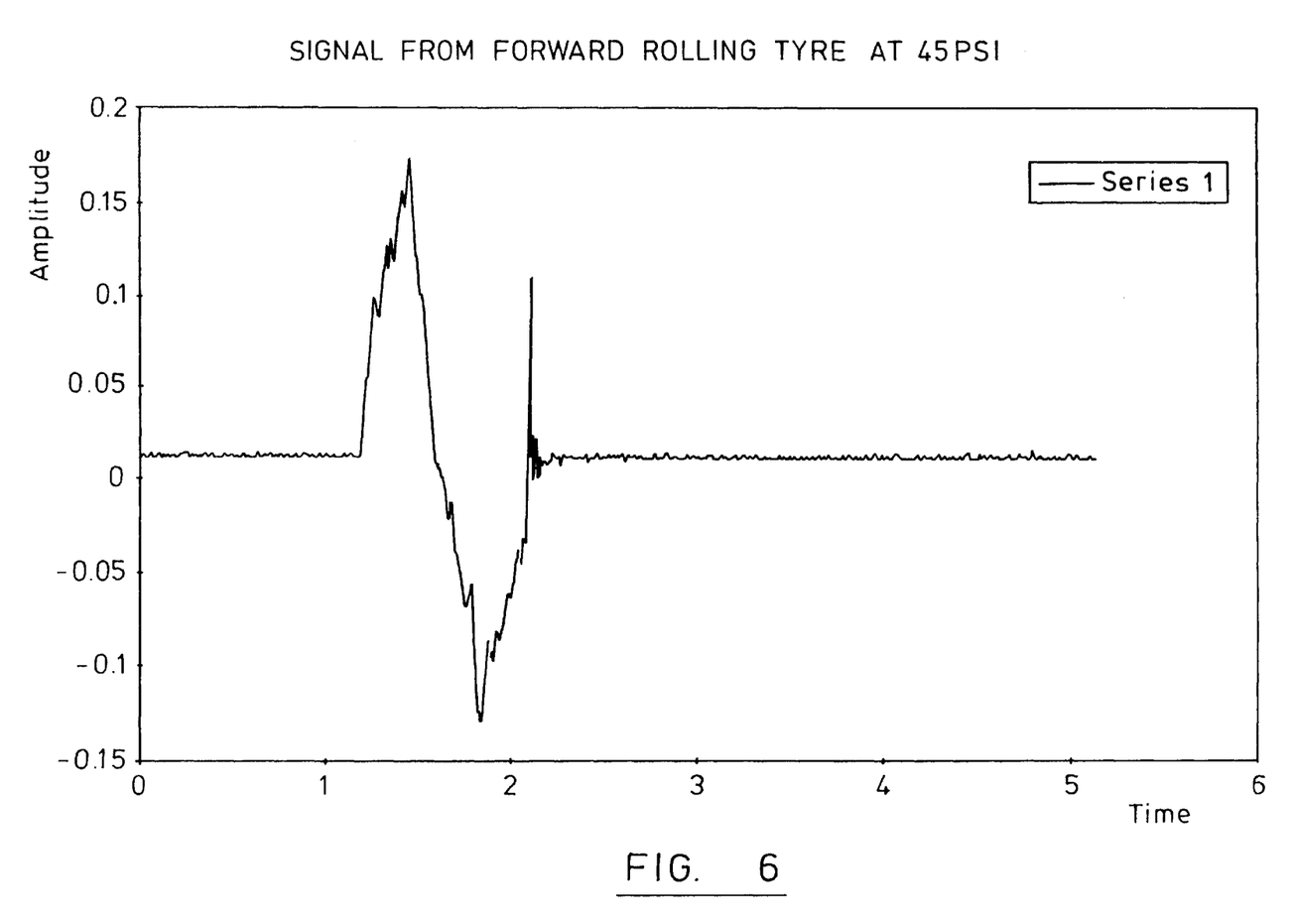
FIG. 6 shows the corresponding waveform profile for an over-inflated tire at 45 psi.

As the vehicle tire in question passes over the cable, so as to compress and load same across the full lateral width of the tire (ie the tire's entire surface area at the relevant portion of its circumference), the cable produces an electromotive force comprising positive and negative-going waveform voltage elements, as shown in FIGS. 4 to 6 of the accompanying drawings. These waveforms, we have discovered, possess characteristic shape components which enable pressure determination to be made on the basis of calibrated reference to previously obtained data. The shape of the voltage profiles obtained depend upon the tire pressure and hence the latter can be readily determined on a look-up reference basis.

In the embodiments, account is taken (by means of a software algorithm) of the influence of vehicle weight and speed (though generally low) in order to isolate as far as possible the data available providing a direct measure of tire pressure. Vehicle weight has a direct relationship to the amplitude of the voltage pulse produced, due to the fact that the voltage produced by a piezo electric device has a direct relationship to the mechanical load applied to the device. Accordingly the weight component of the waveform produced by the device is processed on the basis of calibration data relating vehicle weight to voltage produced, whereby in a given test the output can be standardised by reference to a predetermined and uniform vehicle weight.

As regards the effect of vehicle speed, a direct approach to eliminating this effect is available by merely repeating a given test with the vehicle passing successively over spaced sensor elements at a known separation, whereby the speed component of the data can be readily calculated and eliminated or reduced by an adjustment process.

Therefore with respect to eliminating or reducing the effect of vehicle speed on the waveform, the following details of the approach can be adopted in a simple and cost-effective manner, namely to adopt the use of twin or paired piezo electric cable sensor elements at a known spacing and position so that the tire in question passes over each, successively. In this way, there are generated corresponding twin voltage peaks at time intervals corresponding to vehicle speed. By a simple calculation technique the vehicle speed can be determined and the effect of the vehicle's exact speed can be deduced or offset by reference to known data relating to vehicle speed. In this way, there is obtained a waveform or voltage profile for analysis which, as far as can reasonable be achieved, is free of the effect of vehicle speed. A corresponding adjustment can be made as described above, in respect of vehicle weight.

By arranging for the piezo electric cables to extend non-transversely with respect to the vehicle travel direction it can be arranged that individual wheel assemblies or axles at opposite sides of the vehicle produce corresponding individual signals which can be very easily related to the corresponding tires so that remedial pressure-adjustment steps can be corresponding easily taken.

In the described embodiment the elongated piezo electric cables are mounted at the roadway surface so as to project at least a small distance above the surface while being partially located within corresponding grooves or channels formed at the roadway surface. Below each piezo electric sensors is a base plate which serves as a stable reference surface to support the sensor while it is being loaded in use. Above each sensor is a flexible protective cover extending lengthwise of the sensor to enable it to be loaded by the vehicle wheels while being resistant to surface wear and abrasion and damage by impact with vehicle tires. For example, the protective cover may be convex in format and formed from a flexible polymeric material such as natural or synthetic rubber with or without suitable fillers and/or embedded reinforcement materials. Likewise, various plastics sheet materials and metallic sheet materials will have the requisite wear and flexibility characteristics. Considerable variation in the details of mounting the piezo electric cables may be provided, from the simplicity of merely laying a (sheathed or otherwise protected) cable on a hard surface in the path of vehicles, through a variation of this in which the cables 26 and 28 in FIG. 2 hereof are simply supported on the roadway surface instead grooves therein, through to a more deeply grooved arrangement in which the cables are mainly below the roadway surface but have a flexible material above them in the groove and projecting from the groove for engagement by the vehicle tires.

We are aware that proposals may have been made for interpretation of data obtainable from road-mounted vehicle sensors by reference to the gradient of the voltage profile at some particular presumably symmetrically located position thereon, and the present application is not concerned with such an approach which is considered to be a somewhat subjective basis for analysis as compared with the approach adopted by the present invention, namely that of pressure determination by reference to the overall shape and profile of the voltage pulses produced.

Attention is also drawn to the fact that the embodiments of the present invention produce their corresponding analyzable waveform pulses by the direct compression or loading of the elongated piezo electric cable across the lateral widths of the vehicle tires as they traverse it. The tires themselves exert directly on the simply cable sensor (but of course through one or more protective layers whereby the sensor is not unacceptably damaged or worn by each vehicle passage) a loading which varies according to the tire pressure in a determinable quantitative manner. There is no need to cause the tire to actuate a vibration-generating corrugated plate with multiple transducers producing a signal requiring spectral analysis as in the Brooke reference, nor is there any need to analyse the pattern of sensed contact forces in the tire footprint as in the Exxon references.

Embodiments of the invention will now be described by way of example with reference to the accompanying drawings which show apparatus and corresponding voltage waveform data obtained from the apparatus according to the invention, the waveform data illustrating the differences in waveform profiles and shape produced at tire pressures below and at and above the recommended pressures.

Figure 1:
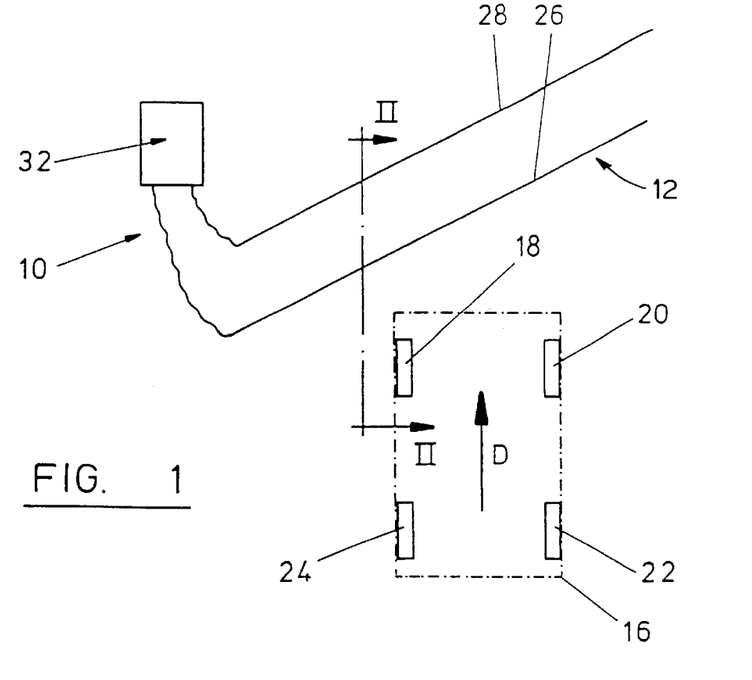
FIG. 1 shows a diagram illustrating the positional relationships between a pair of elongated parallel piezo electric cables connected to a data-processing and display system, and a corresponding automotive vehicle travelling in the direction indicated by the arrow and about to traverse the detector elements.
Figure 2:
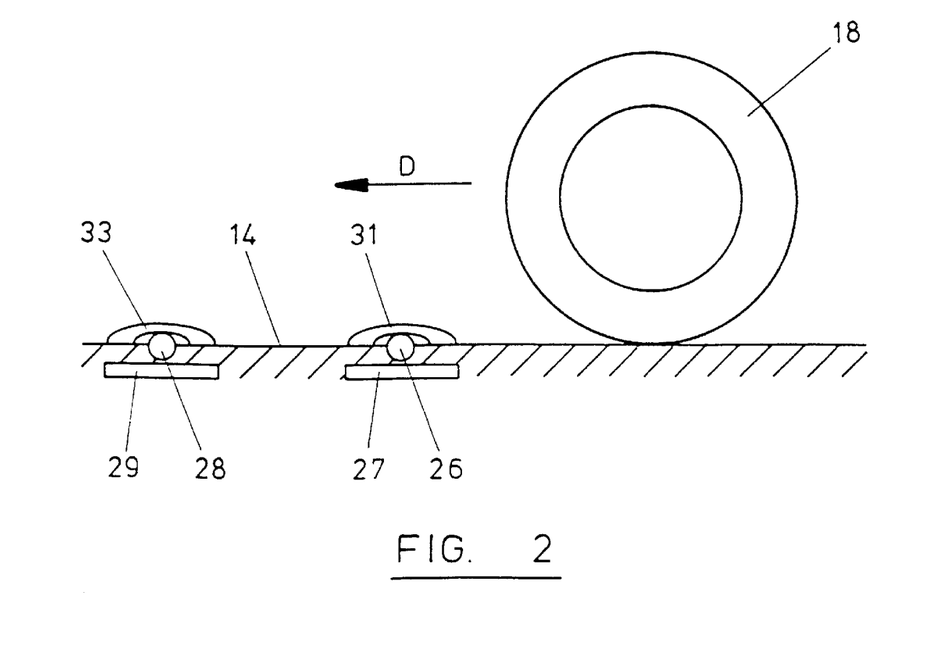
FIG. 2 shows a section and side elevation view in the viewing direction indicated by arrows II—II in FIG. 1 and showing a vehicle wheel about to traverse the spaced piezo electric cables.

As shown in FIGS. 1 and 2, apparatus 10 for analysing data produced by a piezo electric cable device 12 on a roadway 14 traversed by automotive vehicle 16 and which is adapted to enable a determination to be made of the inflation pressure of one or more tires 18, 20, 22, 24 of said vehicle comprises the following main elements. Firstly, the piezo electric device 12 comprises a pair 26, 28 of piezo electric cables for compressive engagement by tires 18 to 24 across the full lateral widths of the tires so as to generate a signal or voltage pulse 30 (see FIG. 3).

Signal analysis means 32 is provided to determine information relating to the tires 18 to 24 of vehicle 16.

As shown in FIG. 1 cables 26, 28 are disposed in parallel relationship to each other, and non-transversely with respect to the direction D of normal forward movement of vehicle 16. The cables are connected to signal analysis and display means 32 to apply voltage pulses 30 thereto.

FIG. 2 shows tire 18 of vehicle 16 approaching the sensors over roadway 14 in direction D and about to create a voltage pulse 30 in sensor 26 for transmission to the signal analysis and display means 32, The piezo electric cables 26, 28 are mounted at the surface of roadway 14 so as to project partially above the surface of the roadways while being located within corresponding grooves or channels formed at the roadway surface. Below each cables is a base plate 27,29 which serves as a stable reference surface to support the cable while it is being loaded in use. Above each cable is a flexible protective cover 31,33 extending lengthwise of the cable to enable it to be loaded by the individual vehicle wheels while being resistant to surface wear and abrasion and damage by impact with vehicle tires 18.

Figure 3:
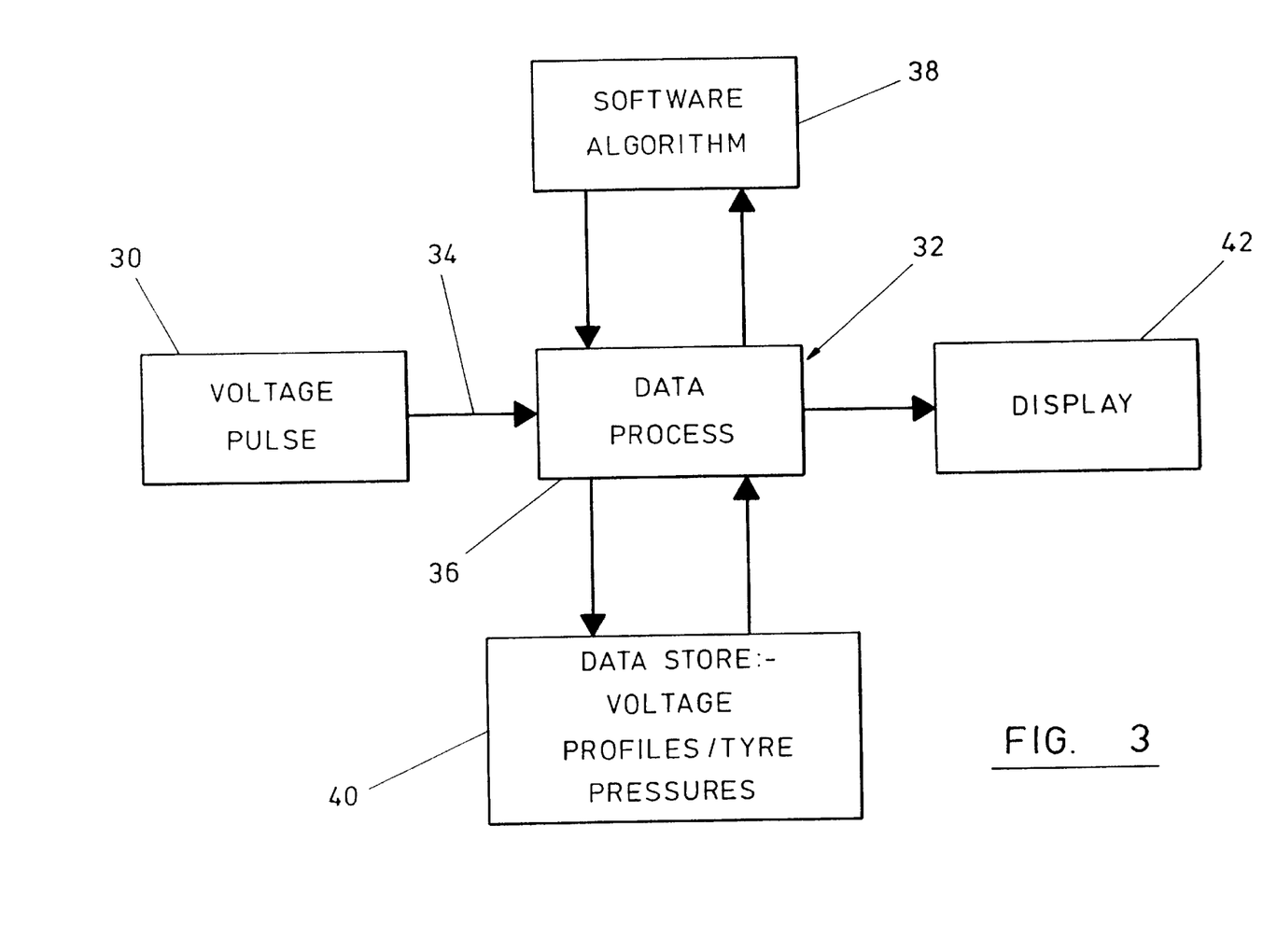
FIG. 3 shows a flow diagram representing the main elements of the data-processing operation involved in analysis of the voltage pulses derived from the piezo electric cables.

Turning now to signal analysis and display means 32, the main characteristics of this data processing system are illustrated in FIG. 3 as a flow diagram in which voltage pulse 30 is connected at 34 via an analogue-to-digital convertor (not shown) to a data processing system 36 in which the voltage pulses 30 are processed in an analogous manner to that of the data-processing system disclosed in our co-pending application number EP 96305506.6 published Jan. 29, 1997 (our reference P52740EP). We hereby incorporate into the present application the entire disclosure of our above-mentioned prior application which is published as EP 0 756 167. In accordance with the principles there disclosed, the software system of data processor 36 comprises a software algorithm 38 for interpretation of the waveforms (see FIGS. 4 to 6) in accordance with a data store 40 of voltage profiles corresponding to known tire pressures, whereby the waveforms of signals 30 from sensors 26, 28 are recognised in terms of their characteristic profiles, which can be identified on a look-up basis as representing specific points along the progressive pattern of voltage waveforms or profiles, which progressively change with tire pressure, whereby the corresponding tire pressures can be readily identified and displayed quantitatively (numerically) at 42. Alternatively or supplementally an algorithmic analysis may be provided to effect the corresponding quantitative pressure determination.

In the examples shown in FIGS. 4 to 9, the waveforms of, the voltage pulses produced are illustrated using a storage oscilloscope connected to a single length of 20 grade piezo electric cable placed on the workshop floor at an angle of less than 90° to the direction D of the travel of vehicle 16. In these simple tests, the vehicle was pushed so that one tire 18 passed forwards over the first cable 26 to produce the voltage pulses shown in FIGS. 4 to 6 of the accompanying 4 to 6 of the accompanying drawings.

The test procedure was carried out with the vehicle tire at the three different pressures of 15 and 28 and 45 pounds per square inch, thereby producing the voltage pulse profiles shown. In each case the vehicle was pushed forwards over the cable.

The results in FIGS. 4 to 6 show that there is a progressive difference in shape or profile of the waveform of the voltage pulse due to the differences in pressure of the tire.

By means of a graded series of tests producing a corresponding graded sequence of voltage profiles, it is possible to build up the data store 40 enabling positive identification of specific tire pressures from the corresponding voltage pulse profiles so that pressure becomes readily determined on a look-up and/or algorithmic basis.

By means of the mutually parallel sensors 26, 28 in FIG. 1 which each provide its own voltage pulse for each of the four wheels of vehicle 16 in FIG. 1 there can be readily obtained two tire pressure readings for each wheel.

The effect of weight and vehicle speed on the waveform amplitudes and profiles can be readily offset by means of calibration data relating thereto. The known spacing between sensors 26, 28 enables the speed of the vehicle to be readily computed and thus to be offset by means of look-up data or algorithmic analysis. Likewise a corresponding offset for vehicle weight can be readily obtained by means of either additional weight-sensing means in the roadway surface or by means of a simple vehicle categorisation for weight system.

In a modification two or more piezo electric cables are disposed in spaced and generally parallel relationship so as to provide numbers of signals or pulses in accordance with the number of tires (on associated axles) which engage the cables at each side of a vehicle. In this way, the apparatus can determine the numbers of corresponding axles and associated tires to be pressure-assessed at each side of the vehicle.

What is claimed is:

1. A method of analysing data produced by a piezo electric device located on a roadway traversed by automotive vehicles, comprising:
   a) locating a piezo electric detector for engagement with a tire of an automotive vehicle;
   b) causing said vehicle to pass over said detector and to generate a signal;
   c) analysing said signal to determine information relating to said vehicle; characterised by;
   d) said step of analysing said signal to determine information to said vehicle comprising analysing the waveform of said signal to eliminate or reduce the effect of vehicle weight on said waveform.

2. A method according to claim 1 characterised by said step of locating said piezo electric detector for engagement by a tire of an automotive vehicle comprising employing as said detector a piezo electric sensor element adapted to be subjected to localised loading.

3. A method according to claim 2 characterised by said piezo electric detector being adapted for said localised loading by said piezo-electric detector being in the form of an elongated element of rope or cable of strand-like form so that said loading is applied mechanically only to a portion of the external profile thereof.

4. A method according to claim 1 characterised by said step of analysing said signal further comprising analysis of the shape or profile of a waveform produced by compressive loading of said piezo electric detector, to determine on an algorithmic and/or look-up basis the pressure of said tire.

5. A method according to claim 4 characterised by said step of analysing said signal to determine said information comprising employing an algorithm to analyze said waveform on the basis of progressive wave form shape changes therein with respect to progressive tire pressure changes.

6. A method according to claim 1 characterised by the step of providing two spaced piezo electric detectors positioned in said roadway for sequential traversing by automotive vehicles, and said step of analysing said signal to determine information relating to said vehicle comprising obtaining from the signals successively produced by said tire, a measure of the vehicle speed and adjusting the waveform in accordance with the speed on the basis of known data.

7. A method according to any one of the preceding claims characterised by said analysis to eliminate or reduce the effect of vehicle weight comprising adjusting the waveform amplitude in accordance with calibration data relating to vehicle weight.

8. A method according to claim 7 characterised by said step of analysing said waveform to eliminate or reduce the effect of vehicle speed on said waveform comprising effecting an adjustment step in relation to data obtained from said piezo electric detector for time interval data obtained by said tire passing sequentially over detectors at a known spacing.

9. A method according to claim 8 comprising locating said piezo electric detector in the form of an elongated detector disposed non-transversely with respect of the intended vehicle direction of normal forward travel so that the wheels on opposite sides of a vehicle engage said detector non simultaneously and thus produce sequential signals which can be individually analyzed.

10. Apparatus for analysing data produced by a piezo electric detector located in a roadway traversed by automotive vehicles the apparatus comprising;
   a) a mounting for a piezo electric detector adapted to mount same for engagement by tires of automotive vehicles, so that said tires can pass over said detector to generate a signal;
   b) signal analysis means to determine information relating to said vehicle; characterised by:
   c) said analysis means being adapted to analyse the waveform of said signal to reduce or eliminate the effect of vehicle weight on said waveform.

11. Apparatus according to claim 10 characterised by said analysis means being adapted to analyze the shape or profile of said waveform produced by compressive loading of said piezo electric detector to determine on an algorithmic and/or look-up basis the pressure of said tire.

12. Apparatus according to claim 10 or claim 11 characterised by said piezo electric detector comprising a sensor element adapted to be subjected to localised loading when mounted thus by said mounting.

13. Apparatus according to claim 11 characterised by said analysis means being adapted to employ an algorithm to analyze said waveform on the basis of progressive waveform shape changes therein with respect to pressure.

14. Apparatus according to claim 12 characterised by said detector being adapted for said localised loading by being in the form of an elongated element of rope or cable or strand-like form so that said loading is applied mechanically only to a portion of the external profile thereof.

15. Apparatus according to claim 10 characterised by the piezo electric detector including a pair of spaced piezo electric detector cables to be traversed in sequence by said automotive vehicle, and said analysis means being adapted to determine a measure of the vehicle speed and to adjust said waveform or profile for analysis in accordance with said vehicle speed.

16. Apparatus according to claim 10 characterised by said piezo detector cables comprising an elongated detector element adapted to be disposed non transversely with respect to the intended direction of normal forward vehicle travel when engaging same so that wheels on opposite sides of a vehicle engage said detector non-simultaneously and thus produce sequential signals which can be individually analyzed.

17. Apparatus according to claim 16 characterised by at least two of said piezo electric cables being provided and disposed in generally parallel relationship so as to provide sequences of signals in accordance with the number of tires (on associated axles) which engage the cables at each side of a vehicle whereby the apparatus can determine the numbers of corresponding axles and associated tires to be pressure-assessed at each side of the vehicle.

* * * * *

UNITED STATES PATENT AND TRADEMARK OFFICE
CERTIFICATE OF CORRECTION

PATENT NO. : 6,343,506 B1
DATED : February 5, 2002
INVENTOR(S) : Barbara L. Jones et al.

It is certified that error appears in the above-identified patent and that said Letters Patent is hereby corrected as shown below:

<u>Title page,</u>
Item [57], ABSTRACT,
Line 2, "utilices" should be -- utilises --.

<u>Column 7,</u>
Line 30, insert -- relating -- before "to".

Signed and Sealed this

Twenty-third Day of April, 2002

Attest:

Attesting Officer

JAMES E. ROGAN
*Director of the United States Patent and Trademark Office*